July 6, 1965 G. A. DEAN ETAL 3,193,700

RAMP GENERATOR CIRCUIT EMPLOYING TWO CAPACITORS, ONE INCLUDING MEANS FOR RAPID DISCHARGING THEREOF

Filed Feb. 23, 1961

INVENTORS
George A. Dean
Joseph G. Green
Robert M. Henderson

BY George A. Woodruff
ATTORNEY 3,193,700
RAMP GENERATOR CIRCUIT EMPLOYING TWO CAPACITORS, ONE INCLUDING MEANS FOR RAPID DISCHARGING THEREOF George A. Dean and Joseph G. Green, Beloit, and Robert M. Henderson, Williams Bay, Wis., assignors, by mesne assignments, to Fairbanks Morse Inc, New York, N.Y., a corporation of Delaware Filed Feb. 23, 1961, Ser. No. 91,191
9 Claims. (Cl. 307—88.5)

Figure 1:
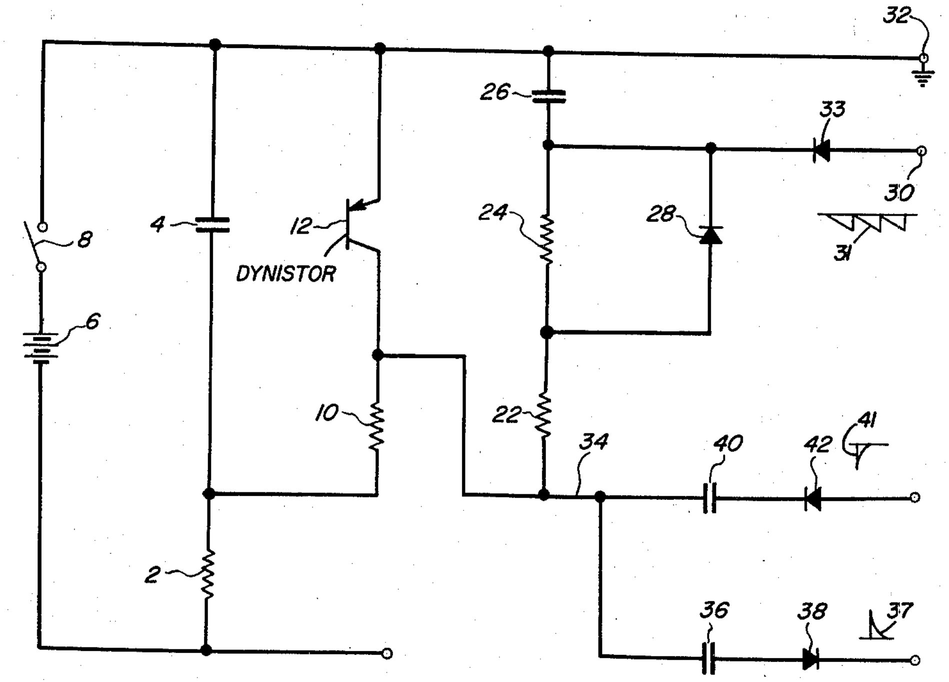

This invention relates to ramp generator circuits and is particularly directed to a novel ramp generator circuit which provides a plurality of pulse type signals which are correlated in time with the start of the ramp signal.

In the electronic art, it is frequently desirable to provide a linearly increasing voltage signal, commonly referred to as a "ramp" signal. Such ramp signals find wide usage in comparison circuits, such as are found in differential amplifiers, electronic weighing systems and the like, and as the triggering signal for sequential actuating circuits. Frequently, ramp signals are employed, in conjunction with pulse generating circuits, in such a way that the number of pulses generated during the rise period of the ramp signal will be indicative of desired information. A typical circuit involving such usage is disclosed in the copending application of Roberto Ortiz Muniz and Lawrence R. Culver, Serial No. 19,104, filed March 31, 1960, now Patent No. 3,160,811, entitled "High Speed Weighing System."

As a result of the great utility of ramp generator circuits, numerous types of such circuits have been proposed heretofore. However, none of the prior art circuits have been entirely satisfactory. Many of the prior art ramp generator circuits have employed electron discharge tubes and have been comparatively large and bulky. Other such circuits have been unduly complicated and delicate. In addition, to connect the ramp generator circuits of the prior art for cooperation with a pulse generating circuit, as described above, much delicate and complicated circuitry has been reqiured. For example, in such systems, it is essential that the pulse generator be triggered at precisely the instant that the ramp signal voltage starts to rise. Any lack of coincidence of these events will result in an erroneous number of pulses being generated during the rise period of the ramp signal and may provide wrong information or cause apparatus to fail or misfunction. Lack of precision on this point has marked the vast majority of prior art ramp generators and has caused others to resort to complicated, delicate and expensive apparatus to overcome this problem.

These disadvantages of the prior art are overcome with the present invention and a novel ramp generator circuit is provided which is simple, compact and economical and yet produces a ramp signal having desirable linearity characteristics and, in addition, produces a plurality of pulse signals which are correlated in time with the start of the ramp signal rise period and, hence, are available to ensure coincidence between the start of the ramp signal and the triggering of pulse generators or the like.

The advantages of the present invention are preferably attained by providing a novel ramp generator circuit comprising a source of energizing voltage; a first resistor; a first capacitor; said first resistor and said first capacitor being connected in series with each other across said source; a multi-junction, two terminal, semiconductor switch; said switch being connected in shunt with said first capacitor; a second resistor; a second capacitor; said second resistor and said second capacitor being connected in series with each other and in shunt with said switch; and a unidirectional current device connected in shunt with said second resistor.

Accordingly, it is an object of the present invention to provide a novel ramp generator circuit.

Another object of the present invention is to provide a novel ramp generator circuit which is simple, compact and economical.

A further object of the present invention is to provide a novel ramp generator circuit which also produces a plurality of pulse signals which are correlated in time with the start of the ramp signal rise period.

A specific object of the present invention is to provide a novel ramp generator circuit comprising a source of energizing voltage; a first resistor; a first capacitor; said first resistor and first capacitor being connected in series across said source; a multi-junction, two terminal, semiconductor switch; said switch being connected in shunt with said first capacitor; a second resistor; a second capacitor; said second resistor and said second capacitor being connected in series with each other and in shunt with said switch; and a unidirectional current device connected in shunt with said second resistor.

These and other objects and features of the present invention will be apparent from the following detailed description taken with reference to the figures of the accompanying drawing.

Figure 2:
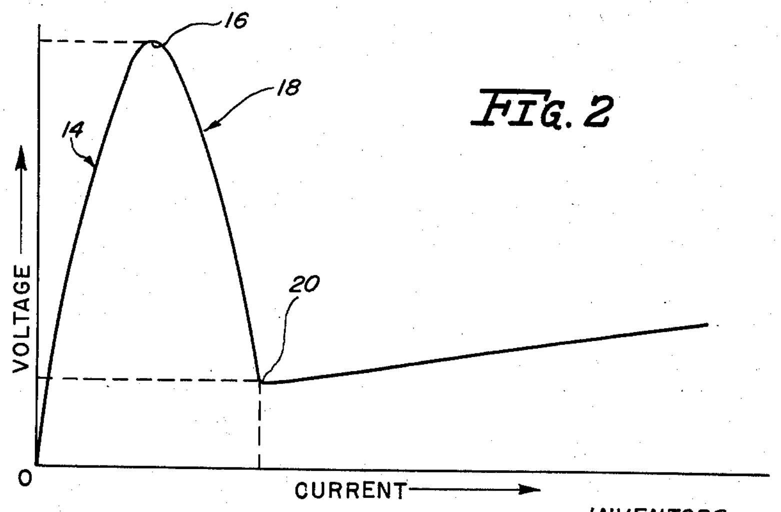

In the drawing:

FIG. 1 is a diagrammatic representation of a typical ramp generator embodying the present invention; and FIG. 2 is a characteristic curve for the semiconductor switch of the circuit of FIG. 1.

In that form of the present invention chosen for purposes of illustration in the drawing, FIG. 1 shows a typical ramp generator having a resistor 2 and a capacitor 4 connected in series across a suitable voltage source 6. A switch 8 may be provided to open and close the circuit. In addition, a resistor 10 and a multi-junction, two terminal, semiconductor switch 12 are connected in series with each other and in shunt with the capacitor 4. The semiconductor switch is preferably of the type known as a "dynister."

As seen in FIG. 2, dynisters have a unique characteristic such that, when a current is applied to the dynister, the dynister initially acts as a high resistance device and passes only a very small current. During this phase of operation, indicated by region 14 of FIG. 2, the voltage across the dynister builds up. When the voltage reaches a certain value, indicated at 16, the dynister switches and becomes a low resistance device which passes a much larger current. This is indicated by region 18 of FIG. 2. Thereafter, so long as the voltage exceeds a second value, indicated a 20, the dynister will continue to operate as a low resistance device. However, when the voltage across the dynister falls below the switch back value 20, the dynister returns to its high resistance condition and will act as a high resistance device until the switching voltage 16 is again obtained.

To continue with the description of the ramp generator circuit of FIG. 1, resistors 22 and 24 and capacitor 26 are connected in series with each other and in shunt with the semiconductor switch 12. Moreover, a unidirectional current device, such as diode 28, is connected in shunt with the resistor 24.

In operation, when switch 8 is initially closed, dynister 12 is in its high resistance state. Consequently, capacitors 4 and 26 begin to charge toward a voltage equal to that of the source 6. Moreover, as the charge builds up on the capacitors 4 and 26, the potential across the dynister 12 will increase. This will continue until the potential across the dynister 12 exceeds the switching value, indicated at 16 in FIG. 2. When this occurs, the dynister 12 switches instantaneously from a high resistance condition to a low resistance condition and allows capacitors 4 and 26 to discharge through dynister 12. Diode 28 is preferably arranged to pass current only when capacitor 26 is discharging. This shunts resistance 24 and allows capacitor 26 to discharge at a much faster rate than capacitor 4. Thus, capacitor 26 will discharge to ground potential while capacitor 4 still retains considerable charge. As a result of this, the charging and discharging of capacitor 26 provides a negative ramp voltage signal 31 through diode 33 with reference to ground potential which is available between contact 30 and ground reference contact 32.

As long as the current flow from capacitor 4 exceeds the switch back value of dynister 12, indicated at 20 in FIG. 2, the dynister 12 will remain in a low resistance condition and capacitor 4 will continue to discharge. However, when the charge on capacitor 4 falls below this level, dynister 12 will return to its high resistance condition. Thereupon, capacitors 4 and 26 will begin charging once more toward the value of the source 6.

In addition to providing a ramp signal, as hereinabove described, the circuit of the present invention also provides a plurality of pulse type signals which are correlated in time with the start of the ramp signal rise period and which may, therefore, be employed to trigger pulse generator circuits or to perform other useful tasks. These pulses will appear on conductor 34. It will be seen that when switch 8 is first closed, the output on conductor 34 will have a strong negative potential and will maintain this strong negative potential as long as dynister 12 remains in a high resistance condition. However, when dynister 12 switches to a low resistance condition, the potential on conductor 34 immediately becomes substantially equal to ground potential. This change from a strong negative potential to substantially ground potential is a change in a positive direction and is, effectively, a positive pulse 37 occurring precisely at the instant that the ramp signal ends its rise period and falls to ground potential. This positive pulse 37 may be applied through suitable means, such as coupling capacitor 36 and diode 38, to serve various functions, such as to stop a pulse generator and trigger an indicating device to indicate the number of pulses which have been emitted by the pulse generator during the rise period of the ramp signal.

Subsequently, when dynister 12 switches from a low resistance condition to a high resistance condition, the potential on conductor 34 will change from substantially ground potential to a strongly negative potential. This is a change in a negative direction and is, effectively, a negative pulse 41 occurring at the precise instant that capacitor 26 starts charging to produce the rise period of the ramp signal. This negative pulse 41 may be applied through suitable means, such as coupling capacitor 40 and diode 42 to trigger a pulse generator simultaneously with the start of the ramp signal rise period.

It will be apparent that by proper selection of the values of resistors 2 and 10 and capacitor 4, the frequency of the ramp signal may be varied over a considerable range. In addition, numerous other variations and modifications of the present invention may obviously be made without departing from the invention. Accordingly, it should be clearly understood that the form of the invention described above and shown in the figures of the accompanying drawing is illustrative only and is not intended to limit the scope of the invention.

What is claimed is:

1. A novel signal generating circuit comprising a source of energizing voltage, first capacitive circuit means connected across said source, normally open voltage sensitive switching means connected in shunt with said first capacitive circuit means, said voltage sensitive switching means being adapted to assume either a conductive or non-conductive state in accordance with the voltage applied thereto, second capacitive circuit means connected in shunt with said switching means, said first and second capacitive circuit means being connected to concurrently charge from said voltage source to render said switching means conductive and to subsequently discharge through said switching means upon the conduction thereof, means connected to said second capacitive circuit means operating to enable said second capacitive circuit means to discharge more rapidly than said first capacitive circuit means to provide a ramp output signal, and output circuit means connected to said second capacitive circuit means to receive said ramp output signal.

2. A novel signal generating circuit comprising a source of energizing voltage, first capacitive circuit means connected across said source, normally open voltage sensitive switching means connected in shunt with said first capacitive circuit means, said voltage sensitive switching means being adapted to assume either a conductive or non-conductive state in accordance with the voltage applied thereto, second capacitive circuit means connected in shunt with said switching means, said first and second capacitive circuit means being connected to concurrently charge from said voltage source to render said switching means conductive and to subsequently discharge through said switching means upon the conduction thereof, means connected to said second capacitive circuit means operating to enable said second capacitive circuit means to discharge more rapidly than said first capacitive circuit means to provide a ramp output signal, first output circuit means connected to said second capacitive circuit means to receive said ramp output signal, and second output circuit means connected to said voltage sensitive switching means, said second output circuit means operating to transmit a first output pulse when said voltage sensitive switching means initially becomes non-conducting and a second output pulse when said voltage sensitive switching means becomes conductive.

3. The novel signal generating circuit of claim 2 in which said second output circuit means includes a first output branch incorporating a unidirectional conducting device poled to pass a positive voltage pulse when said voltage sensitive switching means initially becomes conconductive and a second output branch shunting said first output branch, said second output branch including a unidirectional conducting device poled to pass a negative voltage pulse when said voltage sensitive switching means initially becomes non-conductive.

4. A novel signal generating circuit comprising a source of energizing voltage, first capacitive circuit means connected across said source, normally open voltage sensitive switching means connected in shunt with said first capacitive circuit means, said voltage sensitive switching means being adapted to assume either a conductive or non-conductive state in accordance with the voltage applied thereto, second capacitive circuit means connected in shunt with said switching means, said first and second capacitive circuit means being connected to concurrently charge from said voltage source to render said switching means conductive and to subsequently discharge through said switching means upon the conduction thereof, means operating to discharge said second capacitive circuit more rapidly than said first capacitive means, and output circuit means connected to said second capacitive circuit means connected to said voltage sensitive switching means, said output circuit means operating to transmit a first output pulse when said voltage sensitive switching means initially becomes non-conducting and a second output pulse when said voltage sensitive switching means initially becomes conductive.

5. A novel signal generating circuit comprising a source of energizing voltage, a first resistor, a first capacitor, said first resistor and first capacitor being connected in series with each other across said source, a multijunction, two terminal, semiconductor switch connected in shunt with said first capacitor, said semiconductor switch being adapted to assume a conductive or non-conductive state in accordance with the voltage applied thereto, a second resistor and a second capacitor connected in series with each other and in shunt with said switch, said second capacitor being connected to charge concurrently with said first capacitor from said voltage source to render said switch conductive, and to discharge with said first capacitor through said switch upon the conduction thereof, a unidirectional current device connected in shunt with said second resistor, said unidirectional current device being conductive upon the discharge of said second capacitor whereby said second capacitor is discharged more rapidly than said first capacitor to achieve a ramp output signal, and output means connected between said second resistor and second capacitor to transmit said ramp output signal.

6. A novel signal generating circuit comprising a source of energizing voltage, a first resistor, a first capacitor, said first resistor and said first capacitor being connected in series across said source, a multi-junction, two terminal, semiconductor switch connected in shunt with said first capacitor, said semiconductor switch being adapted to assume a conductive or non-conductive state in accordance with the voltage applied thereto, a second resistor and a second capacitor connected in series with each other and in shunt with said switch, said second capacitor being connected to charge concurrently with said first capacitor from said voltage source to render said switch conductive and to discharge with said first capacitor through said switch upon the conduction thereof, a unidirectional current device connected in shunt with said second resistor, and pulse signal output means connected to a point between said first resistor and said switch, said pulse signal output means operating to transmit an output pulse when said switch changes conductive states.

7. The novel signal generating circuit of claim 6 in which said pulse signal output means includes a first output branch incorporating a unidirectional conducting device poled to pass a positive voltage pulse when said switch initially becomes conductive, and a second output branch shunting said first output branch, said second output branch including a unidirectional conducting device poled to pass a negative voltage pulse when said switch initially becomes non-conductive.

8. A novel signal generating circuit comprising a source of energizing voltage, a first resistor, a first capacitor, said first resistor and said first capacitor being connected in series across said source, a multi-junction, two terminal, semiconductor switch connected in shunt with said first capacitor, said semiconductor switch being adapted to assume a conductive or non-conductive state in accordance with the voltage applied thereto, a second resistor and a second capacitor connected in series with each other and in shunt with said switch, said second capacitor being connected to charge concurrently with said first capacitor from said voltage source to render said switch conductive and to discharge with said first capacitor through said switch upon the conduction thereof, a unidirectional current device connected in shunt with said second resistor, said unidirectional current device being conductive upon the discharge of said second capacitor whereby said second capacitor is discharged more rapidly than said first capacitor to achieve a ramp output signal, a ramp output signal conductor connected to the junction between said second resistor and said second capacitor to transmit said ramp output signal, and pulse signal output means connected to a point between said first resistor and said switch, said pulse signal output means operating to transmit an output pulse when said switch changes conductive states.

9. A novel signal generating circuit comprising a source of energizing voltage, a first resistor having one end thereof connected to the low potential terminal of said source, a first capacitor connected between the opposite end of said first resistor and ground, a second resistor having one end thereof connected to the opposite end of said first resistor, a multi-junction, two terminal, semiconductor switch connected between the opposite end of said second resistor and ground, said semiconductor switch being adapted to assume a conductive or non-conductive state in accordance with the voltage applied thereto, a third resistor having one end connected to said opposite end of said second resistor, a fourth resistor having one end thereof connected to the opposite end of said third resistor, a second capacitor connected between the opposite end of said fourth resistor and ground, said second capacitor being connected to charge concurrently with said first capacitor from said voltage source to render said switch conductive and to discharge with said first capacitor through said switch upon the conduction thereof, a diode connected in shunt with said fourth resistor, said diode being conductive upon the discharge of said second capacitor whereby said second capacitor is discharged more rapidly than said first capacitor to achieve a ramp output signal, a ramp signal output conductor connected to said opposite end of said fourth resistor to transmit said ramp output signal, and a pulse signal output means connected to said opposite end of said second resistor, said pulse signal output means including a first output branch incorporating a serially connected capacitor and diode, said diode poled to pass a positive pulse when said switch initially becomes conductive, and a second output branch shunting said first output branch, said second output branch including a serially connected capacitor and diode, said diode being poled to pass a negative voltage pulse when said switch initially becomes non-conductive.

References Cited by the Examiner

UNITED STATES PATENTS

| | | | |
|---|---|---|---|
| 2,735,007 | 2/56 | McCurdy | 328—35 |
| 2,797,327 | 6/57 | Kidd | 307—88.5 X |
| 2,855,524 | 10/58 | Shockley | 307—88.5 |
| 3,015,784 | 1/62 | Cirone | 307—88.5 |
| 3,025,414 | 3/62 | McVey | 307—88.5 |

ARTHUR GAUSS, *Primary Examiner.*

HERMAN K. SAALBACH, *Examiner.*